United States Patent [19]
Kato et al.

[11] Patent Number: 5,583,851
[45] Date of Patent: Dec. 10, 1996

[54] MOBILE COMMUNICATION APPARATUS HAVING MULTI-CODES ALLOCATING FUNCTION

[75] Inventors: Osamu Kato; Nobuo Asano, both of Yokohama, Japan

[73] Assignee: Matsushita Electric Industrial Co., Ltd., Osaka, Japan

[21] Appl. No.: 272,158

[22] Filed: Jul. 8, 1994

[30]  Foreign Application Priority Data

Jul. 16, 1993  [JP]  Japan ................................. 5-199014
Jul. 16, 1993  [JP]  Japan ................................. 5-199017

[51] Int. Cl.$^6$ ................................................. H04J 13/04
[52] U.S. Cl. ........................... 370/342; 375/206; 370/468
[58] Field of Search ................................. 370/18, 19, 21, 370/22, 84, 112; 375/200, 205, 206, 40, 96, 100; 371/38.1, 39.1, 44, 45, 37.1

[56]  References Cited

U.S. PATENT DOCUMENTS

| | | | |
|---|---|---|---|
| 5,166,951 | 11/1992 | Schilling | 375/200 |
| 5,235,612 | 8/1993 | Stilwell et al. | 375/200 |
| 5,235,614 | 8/1993 | Bruckert et al. | 370/18 |
| 5,291,515 | 3/1994 | Uchida et al. | 375/200 |
| 5,309,474 | 5/1994 | Gilhousen et al. | 370/18 |
| 5,410,568 | 4/1995 | Schilling | 370/18 |

Primary Examiner—Douglas W. Olms
Assistant Examiner—Chau T. Nguyen
Attorney, Agent, or Firm—Spencer & Frank

[57]  ABSTRACT

A mobile communication unit which can perform a high-bit rate information transmission by allocating a plurality of channel numbers to a user who carries out a high-bit rate communication. The mobile communication unit includes a set of units at the transmitter side 21 and a set of units at the receiver side 22, to carry out communications by allocating spread codes to channels within the same cell. A plurality of channel numbers are allocated to one user. The transmitter side units include the separating unit 23 for separating the user information, the spread modulator 30 for spread processing the separated information by using the spread codes corresponding to the respective channel numbers, and the combining unit 31 for combining the diffused information and outputting the combined information to the receiver side unit. The receiver side units include the despreader 32 for despread the diffused information by using the spread codes of the respective channel numbers allocated to the user, and the multiplexing unit 33 for combining the despreaded information of the plurality of channels. Thus, a high-bit rate transmission service is provided.

3 Claims, 5 Drawing Sheets

| USER NUMBER | CHANNEL NUMBER | ORTHOGONAL SPREAD CODE | ⊗ | PN SERIES | → | SPREAD CODE |
|---|---|---|---|---|---|---|
| #1 | #1 | $W_1(t)$ | ⊗ | $PN(t)$ | → | $S_1(t)$ |
| | #2 | $W_2(t)$ | ⊗ | $PN(t)$ | → | $S_2(t)$ |
| #2 | ⋮ | | | ⋯ | | |
| | #(1+n) | $W_{1+n}(t)$ | ⊗ | $PN(t)$ | → | $S_{1+n}(t)$ |
| #3 | #(2+n) | $W_{2+n}(t)$ | ⊗ | $PN(t)$ | → | $S_{2+n}(t)$ |
| ⋮ | ⋮ | | | ⋯ | | |
| | #m | $W_m(t)$ | ⊗ | $PN(t)$ | → | $S_m(t)$ |

FIG. 9

| USER NUMBER | CHANNEL NUMBER | ORTHOGONAL SPREAD CODE | ⊗ | PN SERIES | → | SPREAD CODE |
|---|---|---|---|---|---|---|
| #1 | #1 | $W_1(t)$ | ⊗ | $PN(t)$ | → | $S_1(t)$ |
| | #2 | $W_2(t)$ | ⊗ | $PN(t)$ | → | $S_2(t)$ |
| #2 | ⋮ | | | ⋯ | | |
| | #(1+n) | $W_{1+n}(t)$ | ⊗ | $PN(t)$ | → | $S_{1+n}(t)$ |
| #3 | #(2+n) | $W_{2+n}(t)$ | ⊗ | $PN(t)$ | → | $S_{2+n}(t)$ |
| ⋮ | ⋮ | | | ⋯ | | |
| | #m | $W_m(t)$ | ⊗ | $PN(t)$ | → | $S_m(t)$ |

FIG. 8

MOBILE COMMUNICATION APPARATUS HAVING MULTI-CODES ALLOCATING FUNCTION

BACKGROUND OF THE INVENTION

1. Field of the Invention

The present invention relates to a mobile communication unit for performing a high-quality information transmission by allocating a plurality of channel numbers to one user.

1. Description of the Related Art

Figure 1:
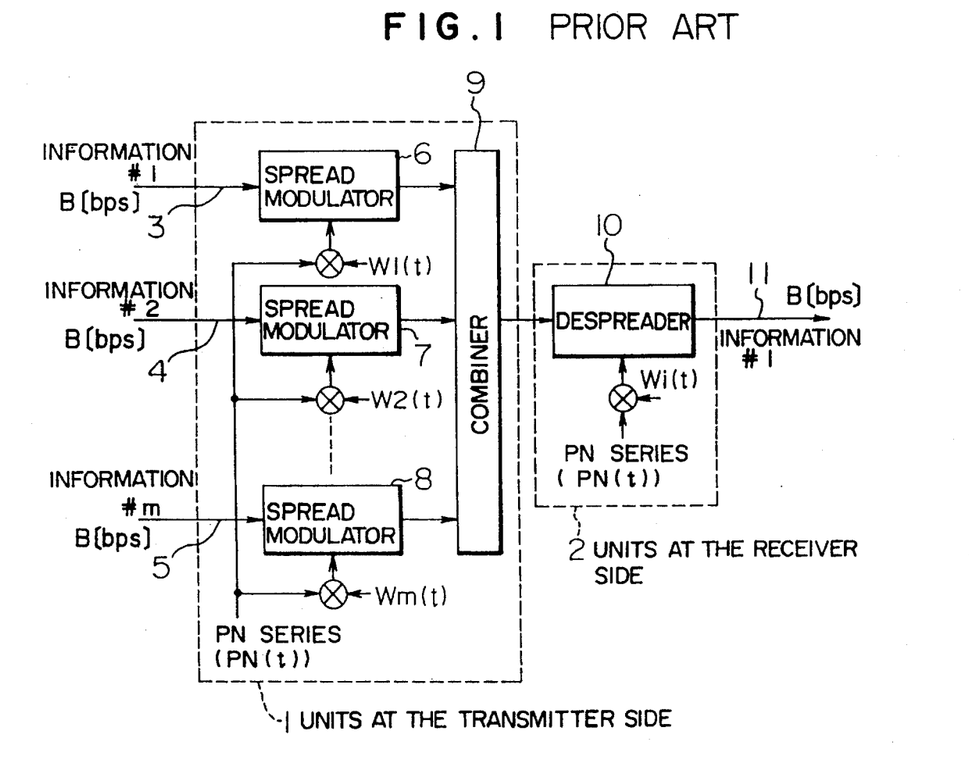
FIG. 1 is a block diagram for showing the configuration of the prior-art mobile communication unit.
Figure 2:
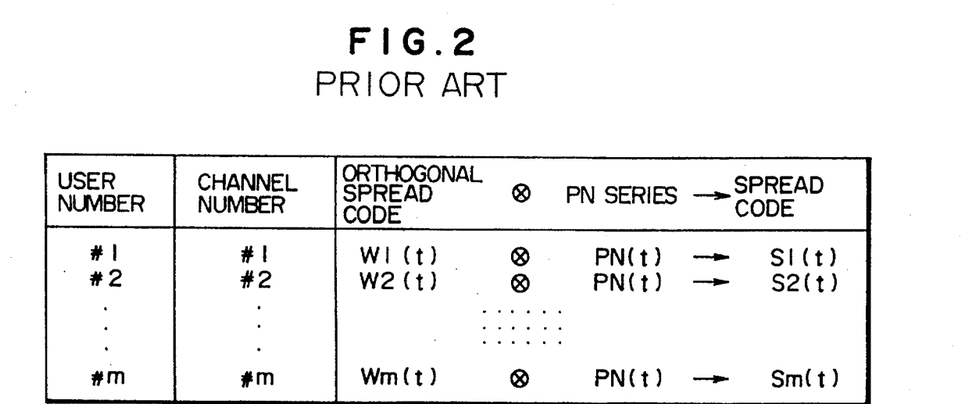
FIG. 2 is a diagram for showing the example of the channel configuration employed in the prior-art technique.

In recent years, a code division multiple access mobile communication unit has been developed for practical application, as described in the literature, "On the System Design Aspects of Code Division Multiple Access (CDMA) Applied to Digital Cellular and Personal Communications Networks, (May 19–22, 1991, IEEE Vehicular Technology Conference)". The configuration of the prior-art technique of the code division multiple access mobile communication unit is shown in FIG. 1. In FIG. 1, a symbol 1 designates a set of units at the transmitter side such as the base station or the like and 2 designates a set of units such as a car telephone set and a portable telephone set at the receiver side. Symbols 3, 4 and 5 designate information input circuits provided corresponding to channel numbers allocated to each user for the set of units at the transmitter side, to which information of the respective users are inputted. An information input circuit 3 corresponds to #1, an information input circuit 4 corresponds to #2, and an information input circuit 5 corresponds to #m. Symbols 6, 7 and 8 designate spread modulators connected to the information input circuits 3, 4 and 5 respectively, for carrying out a spread processing in a spread code corresponding to each channel number. A symbol 9 designates a combining unit for transmitting spread signals of a plurality of users by combining these spread signals together. A symbol 10 designates a despreader for carrying out a despread processing in the spread code of the channel allocated to each user in the sets of units at the receiver side 2. In the set of units at the transmitter side 1, parameters W1(t), W2(t), - - -, and Wm(t) are inputted as orthogonal spread codes and a parameter PN(t) is inputted as a pseudo-noise series, to the spread modulators 6, 7 and 8, respectively. By multiplying these orthogonal spread codes by the pseudo-noise series, spread codes S1(t), S2(t), - - -, and Sm(t) corresponding to the respective channels are obtained, and spread processing is carried out in these spread codes. In the following explanation, the above pseudo-noise series will be referred to as "PN series". In the set of units at the receiver side 2, each unit has the despreader 10. When the channel number of the receiver side units shown in FIG. 1 is #i, a parameter Wi(t) is inputted as an orthogonal spread code and a parameter PN(t) is inputted as a PN series, to the despreader 10, respectively, so that a despread processing is carried out in the spread code corresponding to this channel. FIG. 2 shows an example of the spread codes to be used corresponding to the channel numbers allocated to the users in a certain cell for carrying out the spread and despread processings described above.

In the mobile communication unit having the above-described structure, when user information has been inputted from the information input circuits 3, 4 and 5 at a predetermined information transmission bit rate, for example, B [bps], a spread processing is carried out by the spread modulators 6, 7 and 8 in the spread code corresponding to the channel numbers allocated to the users. Then, the combiner 9 combines the spread signals of the users and transmits the combined result. In the mean time, when the combined spread signal has been received by the units at the receiver side 2, the despreader 10 carries out a despread processing by using the spread code corresponding to the channel number allocated to the user, so that the information is reproduced at the information transmission bit rate B [bps] and is then outputted from an information output circuit 11.

Figure 3:
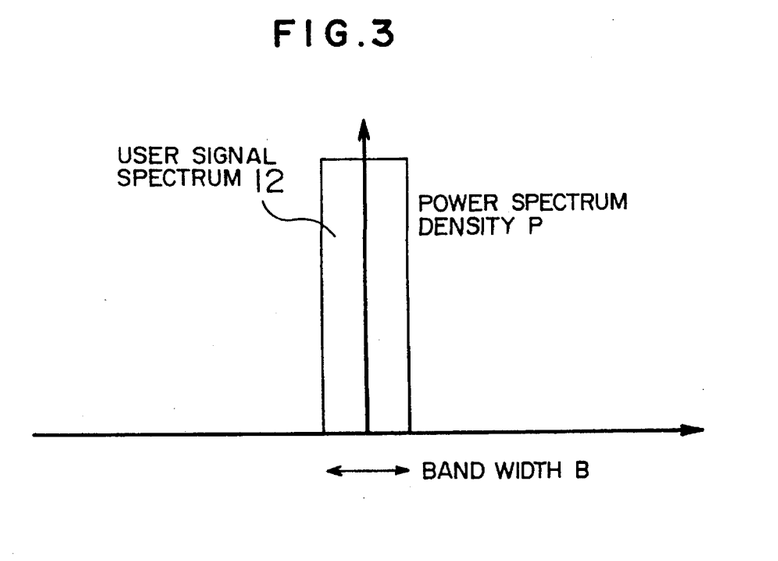
FIG. 3 is a diagram for showing the spectrum signal of user information sent at the current information transmission rate.
Figure 4:
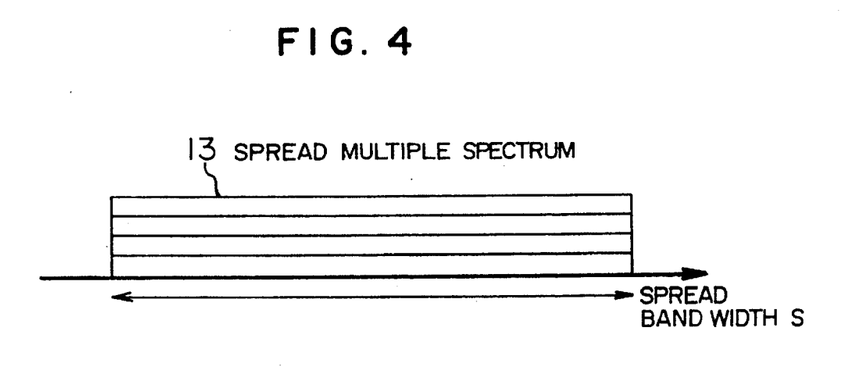
FIG. 4 is a diagram for showing the spread multiple spectrum signal obtained by spread processing the spectrum signal.
Figure 5:
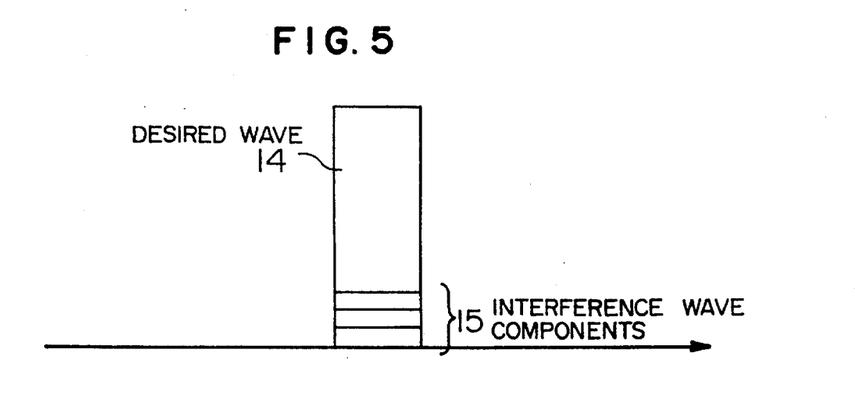
FIG. 5 is a diagram for showing the desired wave and interference wave spectrum obtained by despread processing the spread multiple spectrum signal.

FIGS. 3 to 5 show the status of changes in the waveform of a signal when the signal transmitted as user information at a certain information transmission bit rate is processed, transmitted and despreaded. The user information is inputted from the information input circuits 3, 4 and 5 in the form of a spectrum signal 12 having a band width B and a power spectrum density P as shown in FIG. 3. When the spectrum signal 12 has been spread processed by the spread modulators 6, 7 and 8, the power within the band width B is distributed in a spread band width S of a spread multiple spectrum on the circuit shown in FIG. 4 to form a spread signal 13 as shown in FIG. 4. The spread modulators 6, 7 and 8 correspond to the channel numbers allocated to the users and the spread codes are set to the respective channel numbers at different values as shown in FIG. 2. Therefore, the spread signal 13 takes a multiple structure with different values between channels. FIG. 4 shows an example of a four-channel spread multiple spectrum.

In the unit at the receiver side 2, the spread signal 13 is despread processed in Wi(t) for the orthogonal spread code and PN(t) for the PN series. Therefore, of the four-channel spread multiple spectrum, the spread signal of the channel corresponding to the spread code Si(t), that is, the power of a desired wave, is concentrated to the band width B again, and the multiple other user signals (three channel components) take the spreaded waveform. The waveform in the spreaded status remains as an interference wave. When a filtering is applied to pass the band area B in the unit at the receiver side 2, a spectrum of a desired wave 14 and an interference wave 15 after the despread is obtained as shown in FIG. 5. When an SIR (a signal to interference ratio) which is the ratio of the power of the desired wave 14 to the power of the interference wave 15 takes a predetermined value, required communication quality can be maintained.

When B=9600, that is, the information transmission bit rate is 9600 bps, at most 64 channels can be set within the range in which the SIR can secure a predetermined value, from the viewpoint of an interference ratio. In this respect, there is an example that 64 kinds of Walsh code have been used as orthogonal spread code.

According to the above-described prior-art mobile communication unit, however, there has been a problem that the information transmission bit rate for one user that can be obtained is only not higher than the information transmission bit rate which corresponds to the value obtained by dividing the chip bit rate of the spread code by the spread rate, so that user information that is transmitted at a high information transmission bit rate can not be transmitted.

SUMMARY OF THE INVENTION

It is an object of the present invention to provide a mobile communication unit which can transmit information at a high-bit rate by allocating a plurality of channel numbers to the users who require a high-bit rate communications, to solve the above-described problems.

In order to achieve the above object, the present invention provides a mobile communication unit having units at the transmitter side and units at the receiver side, for carrying out communications by allocating spread code, which are obtained by multiplying orthogonal spread code (number of series: m) by pseudo-noise series, to each channel within the same cell. For the channel numbers within the same cell, spread code which are obtained by multiplying m orthogonal spread codes by pseudo-noise series are corresponded, and a plurality (n pieces) of channel numbers are allocated to one user. The units at the transmitter side include a separating unit for separating user information into n, spread modulating units for spread processing each of the information that has been separated in spread code corresponding to the channel number allocated to the user, and a combining unit for combining the spread processed information and outputting the combined result to the units at the receiver side. The receiver side units include despread units for despreading the spread processed information by using the spread codes of the channels allocated to the user, and a multiplexing unit for combining the despreaded information of n channels.

With the above-described structure, according to the present invention, when a high-bit rate information of nB bits/second (bps) has been transmitted to the user, at the transmitter side, the separating unit separates the user information into n, and then the spread modulating units spread each of the n-separated user information at a bit rate B [bps] by using the spread codes corresponding to the channel numbers. Thus, spread signals of the user information are produced by n, and these spread signals are multiplexed into a spread multiple spectrum by the combining unit. The multiple spread spectrum is then transmitted to the receiver units. At the receiver side, n despread units despread the spread processed information, that has been spreaded at the bit rate B [bps], or the spread multiple spectrum, in the spread code of the channel numbers allocated to one user. The despread units then reproduce the received information by n channels, and the multiplexing unit combines the reproduced information of the n channels into the original user information. In the above-described process, it is possible to provide a high-bit rate information transmission service of nB [bps]. Further, the structure for transmitting and receiving in the code division multiple access at the normal information transmission bit rate B [bps] (that is, the information transmission bit rate of the user to whom only one channel is allocated) can be applied straight to the receiver units. Functions required to be added to the transmitting and receiving units for achieving the high-bit rate transmission are only the function for separating the nB [bps] information into nB [bps] information and the function for reverse multiplexing the information, which does not involve a substantial change of the structure. Further, by only setting the n to various values, it is possible to adapt to information transmission at various bit rates.

DESCRIPTION OF THE PREFERRED EMBODIMENTS

Figure 6:
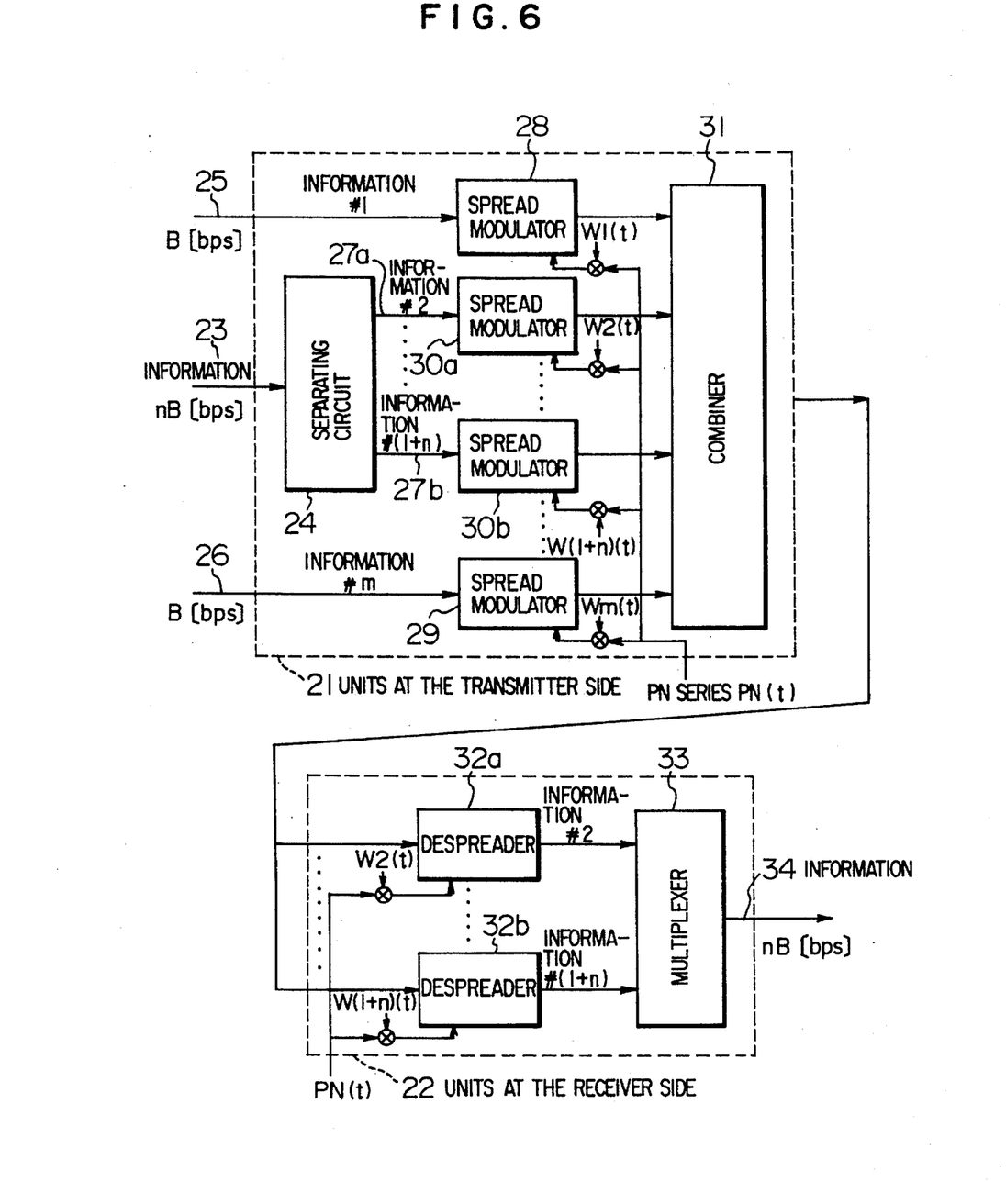
FIG. 6 is a block diagram for showing the configuration of a first embodiment of the mobile communication unit according to the present invention.
Figure 7:
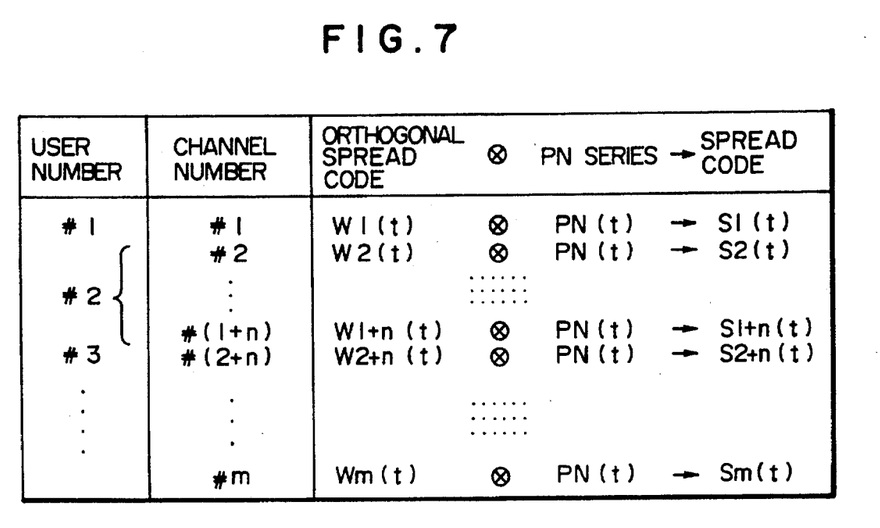
FIG. 7 is a diagram for showing an example of the channel configuration to be employed in the first embodiment.

A first embodiment of the present invention will be explained with reference to the drawings. FIG. 6 is a block diagram for showing the configuration in one embodiment of the present invention. FIG. 7 is a diagram for showing the channel structure in this embodiment. In FIG. 6, a symbol 21 designates a set of units at the transmitter side such as the base station and 22 designate units at the mobile station such as a car telephone set, a portable telephone set, etc. A symbol 23 designates a data circuit for transmitting information of an information transmission bit rate nB [bps], 24 a separating circuit for separating information of an information transmission bit rate nB [bps] into n information of an information transmission bit rate B [bps], and 25 and 26 information input circuits, for inputting user information, provided corresponding to channel numbers, each one channel number allocated to each of users #1, - - -, and #m excluding a user #2 in the transmitter side units 21. 27a, - - -, and 27b designate information input circuits provided corresponding to channel numbers, n channel numbers allocated to one user (the user #2 in FIG. 7), for inputting respective information of n separated information outputted from the separating circuit 24. 28, 29, 30a, - - -, and 30b designate spread modulators connected to the information input circuits 25, 26, 27a, - - -, and 27b respectively, for spread processing by using the spread codes corresponding to the respective channel numbers. 31 designates a combining unit for combining spread signals obtained by the spread processing, generating a spread multiple spectrum and outputting and transmitting this combined signal. In the present embodiment, channel numbers #2 to #(1+n) are allocated to the user #2 who has the n channels.

The receiver side units 22 are the receiver units including portable telephone sets, etc. for the user #2 who has the n channels. In the receiver units 22, symbols 32a, - - -, and 32b designate n despreaders provided corresponding to the channels #2 to #(1+n) allocated to the user #2, for performing a despread processing in the spread code corresponding to the respective channel numbers. 33 designates a multiplexing circuit for combining the despreaded information of the n channels.

In the transmitter side units 21, the separating circuit 24 has the function of separating information of the information transmission bit rate nB [bps] into n information of B [bps] transmission bit rate as described above. However, it is also possible to arrange such that the separating circuit 24 itself has a unit for detecting the bit rate of the user information inputted from the data circuit 23 and the information separation multiple is varied. For example, suppose the user #2 is allocated with a channel number of n=5 (that is, the channel numbers #2, #3, #4, #5 and #6 in FIG. 7), and user information of the transmission bit rate 3B [bps] has been transmitted to the user #2. In this case, the separating circuit 24 can detect the 3B [bps] by the transmission bit rate detecting unit to separate the user information into three and output the separated information by selecting three information input circuits out of the five information input circuits 27a, - - -, and 27b. With this arrangement, it is possible to adapt to various kinds of information transmission bit rates.

The spread modulators 28, 29, 30a and 30b are inputted with parameters W1(t), W2(t), - - -, and Wm(t) as orthogonal spread codes (number of series: m) and a PN(t) as PN series, respectively. The orthogonal spread codes are multiplied by the PN series to obtain spread codes S1(t), S2(t), - - -, and Sm(t) and the spread processing is carried out in these spread codes. In the mean time, in the units at the receiver side 22, the user of these units is allocated with n channels, so that orthogonal spread codes W2(t), - - -, and W1+n(t) corresponding to the channel numbers #2 to #(1+n) are multiplied by the PN series to obtain spread code S2(t), - - -, and S1+n(t), and a despread processing is carried out by using the spread code corresponding to a respective one of these channels. FIG. 7 shows a channel structure for carrying out the spread and despread processings.

The operation of the mobile communication unit having the above-described structure will be explained below. In the transmitter units 21, user information is inputted from the data circuit 23 at the nB [bps] transmission bit rate and user information is inputted from the information input circuits 25 and 26 at the B [bps] transmission bit rate. The user information inputted from the data circuit 23 is separated into n information by the separating circuit 24 and the n information is outputted from the information input circuits 27a, - - -, and 27b at the B [bps] transmission bit rate respectively. Therefore, at this stage, the transmission bit rate of these outputted user information becomes the same as the transmission bit rate of the user information inputted from the information input circuits 25 and 26. Next, the user information inputted from the information input circuits 25, 26, 27a, - - -, and 27b are inputted to the corresponding spread modulators 28, 29, 30a, - - -, and 30b, respectively. After these user information have been spread processed by the spread modulators 28, 29, 30a, - - -, and 30b, these user information are outputted to the combiner 31. The combiner 31 combines, under the same conditions, the spread signals of the plurality of users and the spread signals of the n channels allocated to the user #2, generates a spread multiple spectrum and outputs this signal for transmission.

On the other hand, in the units at the receiver side 22, the combined spread signal is received and this signal is despread processed by the despreader by using the spread code corresponding to a respective one of the channel numbers. When one channel number is allocated to the user receiver side units, one despreader is used, and when n channel numbers are allocated to the user receiver side units, like the user #2, the receiver side units 22 use n despreaders from 32a to 32b, as shown in FIG. 6. In the receiver side units 22, the received information is despread processed by the despreaders 32a, - - -, and 32b so that the received information is reproduced by n channels at the information transmission bit rate B [bps]. The reproduced information is inputted to the multiplexing circuit 33, and the n channel reproduced information are combined by the multiplexing circuit 33 to obtain the original user information, and this information is outputted from the information output circuit 34. Thus, the nB [bps] user information has been reproduced. By referring to FIGS. 3 to 5, description has already been made of the operation status of the changes in the waveform when the signal as the user information, that has been transmitted at the B [bps] transmission bit rate, is spread processed, transmitted and despreaded. Therefore, this explanation will be omitted.

Through the above-described operation, a high-bit rate information transmission service can be provided at the information transmission bit rate nB [bps]. Further, the structure for transmitting and receiving in the code division multiple access at the normal information transmission bit rate B [bps] (that is, the information transmission bit rate of the user to whom only one channel is allocated) can be applied straight to the structure of the receiver side units. Functions required to be added to the transmitting and receiving units for achieving the high-bit rate transmission are only the function for separating the nB [bps] information into n information of B [bps] or the function for reverse multiplexing the information, which does not involve a substantial change of the structure. Further, by only setting the n to various values, it is possible to adapt to information transmission at various bit rates.

Figure 8:
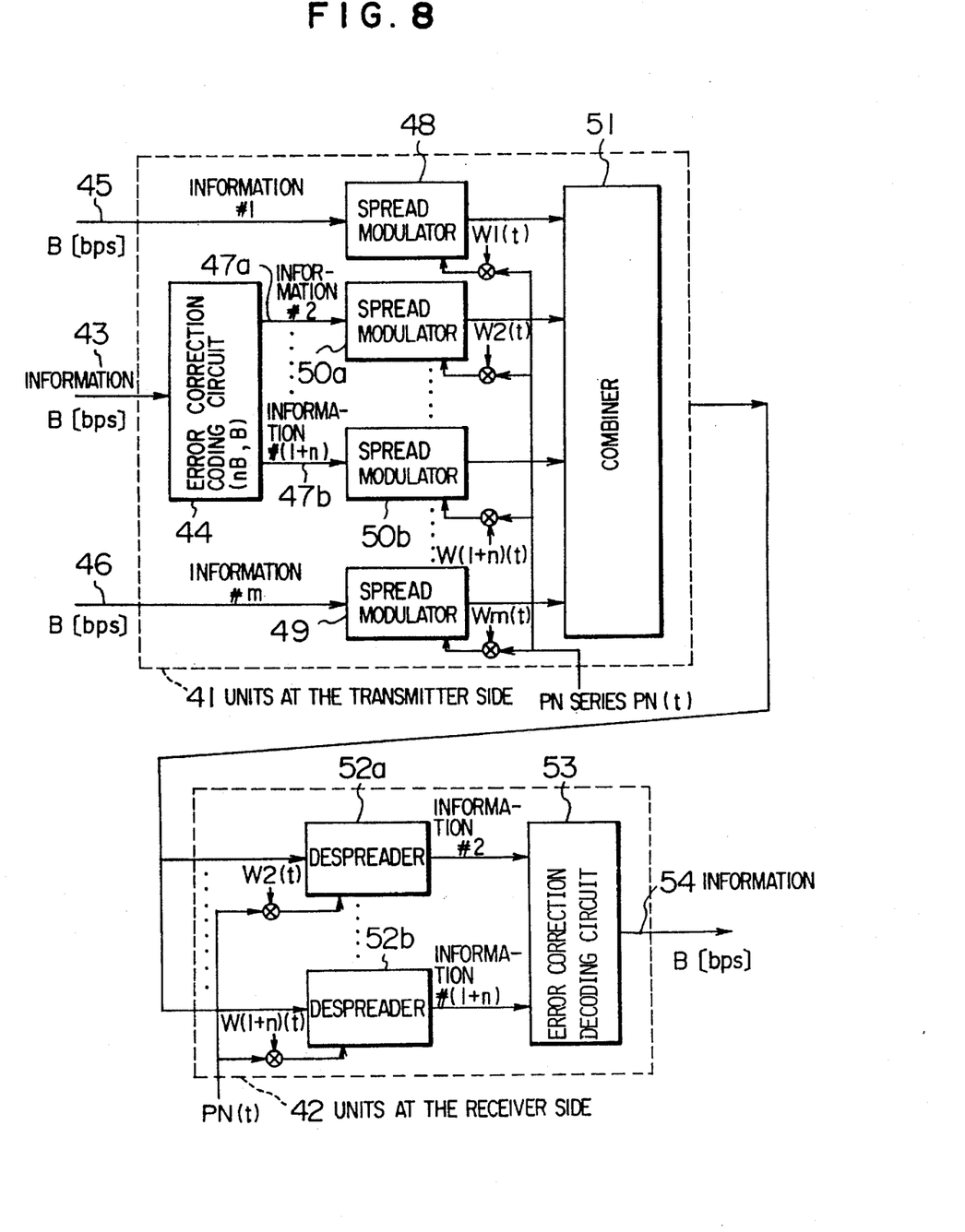
FIG. 8 is a block diagram for showing the configuration of a second embodiment of the mobile communication unit according to the present invention.
Figure 9:
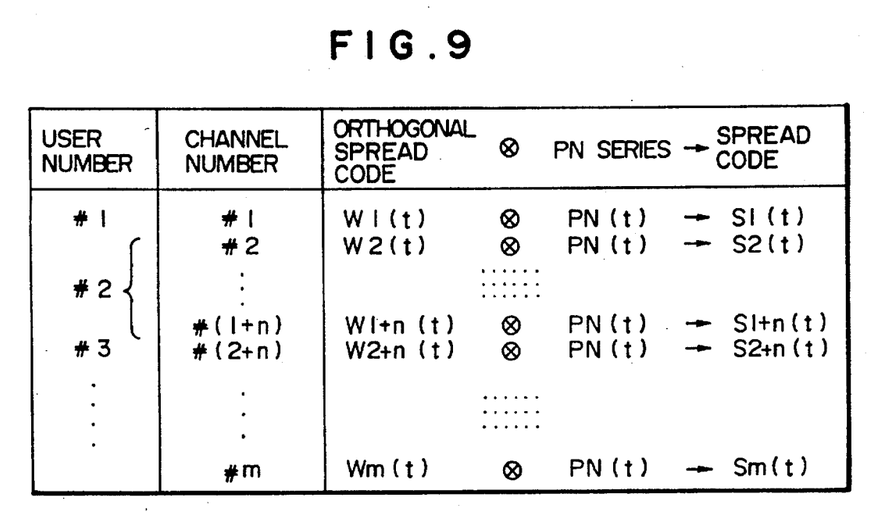
FIG. 9 is a diagram for showing an example of the channel configuration to be employed in the second embodiment.

A second embodiment of the present invention will be explained below with reference to the drawings. FIG. 8 is a block diagram for showing the configuration of one embodiment according to the present invention. FIG. 9 is a diagram for showing the channel structure in this embodiment. In FIG. 8, a symbol 41 designates a set of units at the transmitter side such as the base station or the like, and 42 designates a set of units at the receiver side such as a mobile station, including a car telephone set, a portable telephone set, etc. A symbol 43 designates a data circuit for transmitting user information of B [bps] for a high-quality information transmission, and 44 designates an error correction coding circuit for adding error-correction redundant data to the user information to achieve a high-quality information transmission and for separating the whole information. 45 and 46 designate information input circuits provided corresponding to channel numbers, each one channel number allocated to each user #1, - - -, and #m, excluding a user #2 in the transmitter side units 41, for inputting respective user information. 47a, - - -, and 47b designate information input circuits provided corresponding to channel numbers allocated by n to one user (the user #2 in FIG. 9), for inputting respective n-separated information that have been outputted from the error correction coding circuit 44. 48, 49, 50a, - - -, and 50b designate spread modulators connected to the information input circuits 45, 46, 47a, - - -, and 47b, respectively, for carrying out a spread processing by using the spread codes corresponding to the respective channel numbers. 51 designates a combiner for combining the spread signals obtained by the spread processing, generating a spread multiple spectrum and outputting and transmitting this signal. In the present embodiment, the user #2 having the n channels is allocated with channel numbers #2 to #(1+n).

The receiver side units 42 are the units including a portable telephone set, etc. for the user #2 having the n channels. In the receiver side units 42, symbols 52a, - - -, and 52b designate n despreaders provided corresponding to the channels from #2 to #(1+n) that are allocated to the user #2, for carrying out a despread processing in the spread codes corresponding to the respective channel numbers. 53 designates an error correction decoding circuit for carrying out an error correction processing after combining the despreaded information of n channels.

In the transmitter side units 41, the error correction coding circuit 44 adds redundant data of (n−1)B [bps] for error correction to the user information of B [bps] that has been inputted through the data circuit 43, to generate nB [bps]

information, and separates the whole information into n information of the information transmission bit rate B [bps]. In this case, the error correction coding circuit 44 allocates the user information out of the whole information of nB [bps] to one channel number, separates the redundancy component of the error correction coding of (n−1)B [bps] by (n−1) and allocates each of the separated redundancy components to the remaining (n−1) channel numbers.

The spread modulators 48, 49, 50a, - - -, and 50b are inputted with parameters W1(t), W2(t), - - -, and Wm(t) as the respective orthogonal spread codes (number of series: m) and a parameter PN(t) as the PN series, respectively. The orthogonal spread codes are multiplied by the PN series to obtain spread code S1(t), S2(t), - - -, and Sm(t) corresponding to the respective channels, so that a spread processing is carried out in these spread codes. On the other hand, in the receiver side units 42, the user of these units is allocated with the n channels, so that orthogonal spread codes W2(t), - - -, and W1+n(t) corresponding to the channel numbers from #2 to #(1+n) are multiplied by the PN series to obtain spread codes S2(t), - - -, and S1n(t), to carry out a despread processing by using the spread codes-corresponding to these channels. FIG. 9 shows a table of the channel structure for carrying out these spread and despread processings.

The operation of the mobile communication unit having the above-described structure will be explained below. In the transmitter side units 41, user information for a high-quality information transmission is inputted from the data circuit 43 and user information for a normal quality information transmission is inputted from the information circuits 45 and 46. The information transmission bit rate for both user information is B [bps]. The user information inputted from the data circuit 43 is added to redundancy data of (n−1)B [bps] for error correction by the error correction coding circuit 44, so that information of nB [bps] is generated. The error correction coding circuit 44 further separates the whole information into n information of the information transmission bit rate B [bps]. In this case, the error correction coding circuit 44 allocates the user information out of the whole information of the nB [bps] to one channel number, separates the redundancy component of the error correction of the (n−1)B [bps] by (n−1) and allocates each of the separated redundant components to the remaining (n−1) channel numbers.

The user information inputted from the information input circuits 45, 46, 47a, - - -, and 47b or the redundant components of the error correction coding are inputted to the corresponding spread modulators 48, 49, 50a, - - -, and 50b, respectively, and these information or redundant components are spread processed by the respective spread modulators 48, 49, 50a, - - -, and 50b, and then outputted to the combiner 51. The combiner 51 combines, under the same conditions, the spread signals of a plurality of users and the spread signals of the n channels allocated to the user #2, generates a spread multiple spectrum and outputs and transmits this signal.

On the other hand, in the receiver side units 42, when the combined spread signal has been received, this signal is despread processed by the despreader by using the spread codes corresponding to the respective channel numbers. When one channel number is allocated to the user receiver side units, one despreader is used, and when n channel numbers are allocated to the user receiver side units, like the user #2, the receiver side units 42 have n despreaders from 52a to 52b, as shown in FIG. 8. In the receiver side units 42, the received information is despread processed by the despreaders 52a, - - -, and 52b so that the received information is reproduced by n channels at the information transmission bit rate B [bps]. The reproduced information is inputted to an error correction decoding circuit 53, which combines the n channel reproduced information and then carries out an error correction decoding processing, to obtain the original user information. Then, this information is outputted from the information output circuit 54. In the receiving operation in the receiver side units 42, when reproducing the information of the n channels, redundant data for an error correction is reproduced for the (n−1) channels. Therefore, the user information outputted from the information output circuit 54 becomes the information of extremely high reliability and a high-quality information transmission is achieved. By referring to FIGS. 3 to 5, description has already been made of the operation status of the changes in the waveform when the signal as the user information, that has been transmitted at the B [bps] transmission bit rate, is spread processed, transmitted and despreaded. Therefore, this explanation will be omitted.

Through the above-described operation, a high-bit rate information transmission service can be provided. Further, the structure for transmitting and receiving in the code division multiple access at the normal information transmission bit rate B [bps] (that is, the information transmission bit rate of the user to whom only one channel is allocated) can be applied straight to the structure of the receiver side units. Functions required to be added to the transmitting and receiving units for achieving the high-bit rate transmission are only the error correction coding function for extending the B [bps] information to nB [bps] information and the error correction decoding function for returning the nB [bps] information to the B [bps] information, which does not involve a substantial change of the structure. Further, by increasing the value of the n, it is possible to adapt to a further high-quality information transmission.

User information is transmitted through one specific channel. Therefore, when the transmitter side units 21 have carried out a high-quality transmission and the receiver side units 22 do not require an extremely high-quality information transmission, information can be obtained by decoding only one channel out of the plurality of channels at the cost of information transmission quality. Therefore, it is possible to reduce the operation load at the receiver side units 22. Accordingly, the receiver side units 22 can selectively carry out the operation to expand the range of the information transmission operation, by selecting either the operation of despread the spread processed received information in the spread code of the channel numbers allocated to the user, combining the information of the plurality of channels and then carrying out the error correction processing, or the operation of despread only the user information, in the spread code of the channel number of the user information, out of the spread processed received information As another method for providing a high-quality information transmission to a certain user, there is a method for setting the transmission power of the user who carries out a high-quality information transmission (for example, the required BER is $10^{-5}$) to a higher value than the transmission power of the user who carries out a normal-quality information transmission (for example, the required BER is $10^{-2}$). However, the method of the present invention can make the required transmission power of one user to be smaller by the code gain component that is held by the error correction code. Further, the mobile communication unit which provides a high-quality information transmission by the structure for allocating a plurality of channels to one user, like the present invention, is excellent in its compatibility with a high-bit rate transmission structure when building the system that provides to one user an information transmission service of a high-bit rate exceeding B [bps].

We claim:

1. A mobile communication system of a code division multiple access type for carrying out communications by allocating m spread codes, obtained by multiplying m orthogonal spread codes by a pseudo-noise code, to m channels respectively and allocating n channels to one user where 1<n≧m, said system comprising:

a transmitter for transmitting a transmission signal, including:
error correction coding means for receiving user information data of the user, generating error correction codes for said user information data to obtain a high-rate data stream including said user information data and said error correction codes, and for separating said high-rate data stream into n low-rate data streams;
spread modulating means for multiplying said n low-rate data streams by n spread codes allocated to said n channels respectively to obtain n spread data streams; and
combining means for combining said n spread data streams so as to obtain the transmission signal; and a receiver for receiving the transmission signal from said transmitter, including:
despread means for despreading the transmission signal by using each of said n spread codes allocated to said n channels to obtain said n low-rate data streams; and
error correction decoding means for combining said n low-rate data streams to obtain said high-rate data stream and then error correcting said user information data by using said error correction codes.

2. A mobile communication system according to claim 3, wherein said error correction coding means separates a data stream of said error correction codes into (n–1) low-rate data streams, and allocates said user information data into one of said n channels and said (n–1) low-rate data streams to the other (n–1) channels.

3. A mobile communication system of a code division multiple access type for carrying out communications by allocating m spread codes, obtained by multiplying m orthogonal spread codes by a pseudo-noise code, to m channels respectively and allocating n channels to one user where 1<n≧m, said system comprising:

a transmitter for transmitting a transmission signal, including:
error correction coding means for receiving user information data of the user, generating an error correction code for said user information data, for separating a data stream of said error correction code into (n–1) low-rate data streams, and for allocating said user information data to one of said n channels and said (n–1) low-rate data streams to the other (n–1) channels;
spread modulating means for multiplying user information data and said (n–1) low-rate data streams by n spread codes allocated to said n channels respectively to obtain n spread data streams; and
combining means for combining said n spread data streams so as to obtain the transmission signal; and a receiver for receiving the transmission signal from said transmitter, including:
despread and error correction decoding means for selectively executing one of:
(i) a first operation of despreading the transmission signal by using each of said n spread codes allocated to said n channels to obtain said user information data and said (n–1) low rate data streams, combining said (n–1) low-rate data streams to obtain said error correction code, and then error correcting said user information data by using said error correction code; and
(ii) a second operation of despreading the transmission signal by using one of said n spread codes to obtain only said user information data.

* * * * *

UNITED STATES PATENT AND TRADEMARK OFFICE
CERTIFICATE OF CORRECTION

PATENT NO : 5,583,851
DATED : December 10, 1996
INVENTOR(S): Osamu KATO et al.

It is certified that error appears in the above-identified patent and that said Letters Patent are hereby corrected as shown below:

In claim 1, line 6, "$1<n\geq m$" should be --$1<n\leq m$--.

In claim 3, line 6, "$1<n\geq m$" should be --$1<n\leq m$--.

Signed and Sealed this

Tenth Day of April, 2001

NICHOLAS P. GODICI

Attest:

Attesting Officer

Acting Director of the United States Patent and Trademark Office